(12) United States Patent
Nakazato et al.

(10) Patent No.: US 6,611,987 B1
(45) Date of Patent: Sep. 2, 2003

(54) PIPE FRAME FOR WIPER APPARATUS (75) Inventors: Kouji Nakazato, Yokohama (JP);
Katsuhisa Iozumi, Yokohama (JP)

(73) Assignee: Jidosha Denki Kabushiki Kaisha, Kanagawa-Prefecture (JP)

( * ) Notice: Subject to any disclaimer, the term of this patent is extended or adjusted under 35 U.S.C. 154(b) by 447 days.

(21) Appl. No.: 09/717,021

(22) Filed: Nov. 22, 2000

(30) Foreign Application Priority Data

Nov. 24, 1999 (JP) .......................................... 11-332991

(51) Int. Cl.[7] ............................ B60S 1/02; B60S 1/34; A47L 1/00
(52) U.S. Cl. ................... 15/250.31; 15/250.3; 384/276; 403/269; 29/527.4
(58) Field of Search .......................... 15/250.3, 250.31, 15/250.27, 250.34; 74/42, 43; 384/276, 297, 295; 29/469.5, 527.4; 403/269, 265, 267, 279, 282; 280/281.1

(56) References Cited

U.S. PATENT DOCUMENTS

| 5,174,678 A | * | 12/1992 | Gagneux et al. | 403/269 |
| 5,313,697 A | * | 5/1994 | Kanno et al. | 20/527.4 |
| 5,596,805 A | * | 1/1997 | Kunze et al. | 29/898.055 |
| 5,601,379 A | * | 2/1997 | Princet | 493/269 |
| 5,842,265 A | * | 12/1998 | Rink | 29/460 |
| 6,205,613 B1 | * | 3/2001 | Sahara | 15/250.16 |

* cited by examiner

Primary Examiner—Robert J. Warden, Sr.
Assistant Examiner—Laura C Cole
(74) Attorney, Agent, or Firm—Sughrue Mion, PLLC (57) ABSTRACT

A pipe frame for a wiper apparatus of the motor vehicles which is excellent in the mechanical strength and possible to be manufactured without waste of material resin, which is obtained by unifying a pivot holder 1b on the pipe body 1a through the outsert moulding of resin against a plate portion 1a3 made by compressing the pipe body 1a in the full-contacting state and reinforced by crush-projections 1a11 and 1a12 formed on both sides of the plate portion 1a3 and a hollow cylindrical protrusion 1a4 formed on the plate portion 1a3.

10 Claims, 13 Drawing Sheets

PIPE FRAME FOR WIPER APPARATUS

BACKGROUND OF THE INVENTION

1. Field of the Invention

This invention relates to a pipe frame used for wiper apparatuses of the motor vehicles, which is provided with a pivot holder formed in a united one body.

2. Description of the Prior Art

As a conventional pipe frame of the wiper apparatus formed with a pivot holder in a united one body, there has been known a pipe frame which is provided with the pivot holder formed through outsert moulding of resin at a plate-like portion formed on a part of the pipe frame.

However, in the aforementioned pipe frame, it is necessary to make a hole in the plate-like portion of the pipe frame in order to form a pivot shaft-hole of the pivot holder for supporting a pivot shaft rotatably, therefore the pressworked plate-like portion becomes lower in the mechanical strength and the pipe frame is short in the strength on the whole. Consequently, there is a problem in that there is the possibility that the pivot holder may be dislocated and have an influence on the movements of the wiper in a case where the pipe frame deflects. Further in a case where the pivot holder is formed on the pipe frame through outsert moulding of resin, the resin material sometimes flows into a hollow of the pipe frame through a space opening at the hole in the plate-like portion of the pipe frame, and there is another problem in that the resin material becomes wasteful in such the case.

SUMMARY OF THE INVENTION

Therefore, this invention is made in view of the aforementioned problems of the prior art, and it is an object to provide a pipe frame for the wiper apparatus which is excellent in the mechanical strength and possible to be obtained without waste of the resin material.

The pipe frame for the wiper apparatus according to this invention is characterized by comprising a pipe body with a hollow, a plate portion formed by compressing the pipe body, crush-projections formed on both sides of the plate portion, a hollow cylindrical protrusion formed on the plate portion, and a pivot holder formed through outsert moulding of resin around about the plate portion of the pipe body and provided with a pivot shaft hole communicated with the hollowness of the cylindrical protrusion of the plate portion.

In the pipe frame according to this invention, the pivot holder unites with the pipe body around about the plate portion of the pipe body provided with the crush-projections and the hollow cylindrical protrusion through the outsert moulding of resin, therefore the plate portion of the pipe frame is improved in the mechanical strength by forming the crush-projections on the both sides, thereof and forming the hollow cylindrical protrusion thereon as compared with the conventional pipe frame having the plate-like portion which is formed through the simple press working and provided with the hole for supporting the pivot shaft. Furthermore, the hollow cylindrical protrusion is formed protrudingly through, for example, the press working on the plate portion formed by compressing the pipe body, therefore the inner wall of the hollow cylindrical protrusion is stretched from the surface of he plate portion onto the reverse side and isolates the hollow of the pipe body, and the resin material does not flow into the hollow of the pipe body through a gap formed between walls of the plate portion formed by compressing the pipe body.

DESCRIPTION OF THE PREFERRED EMBODIMENT

An embodiment of the pipe frame for the wiper apparatus according to this invention will be described below on basis of FIGS. 1 to 14.

Figure 1:
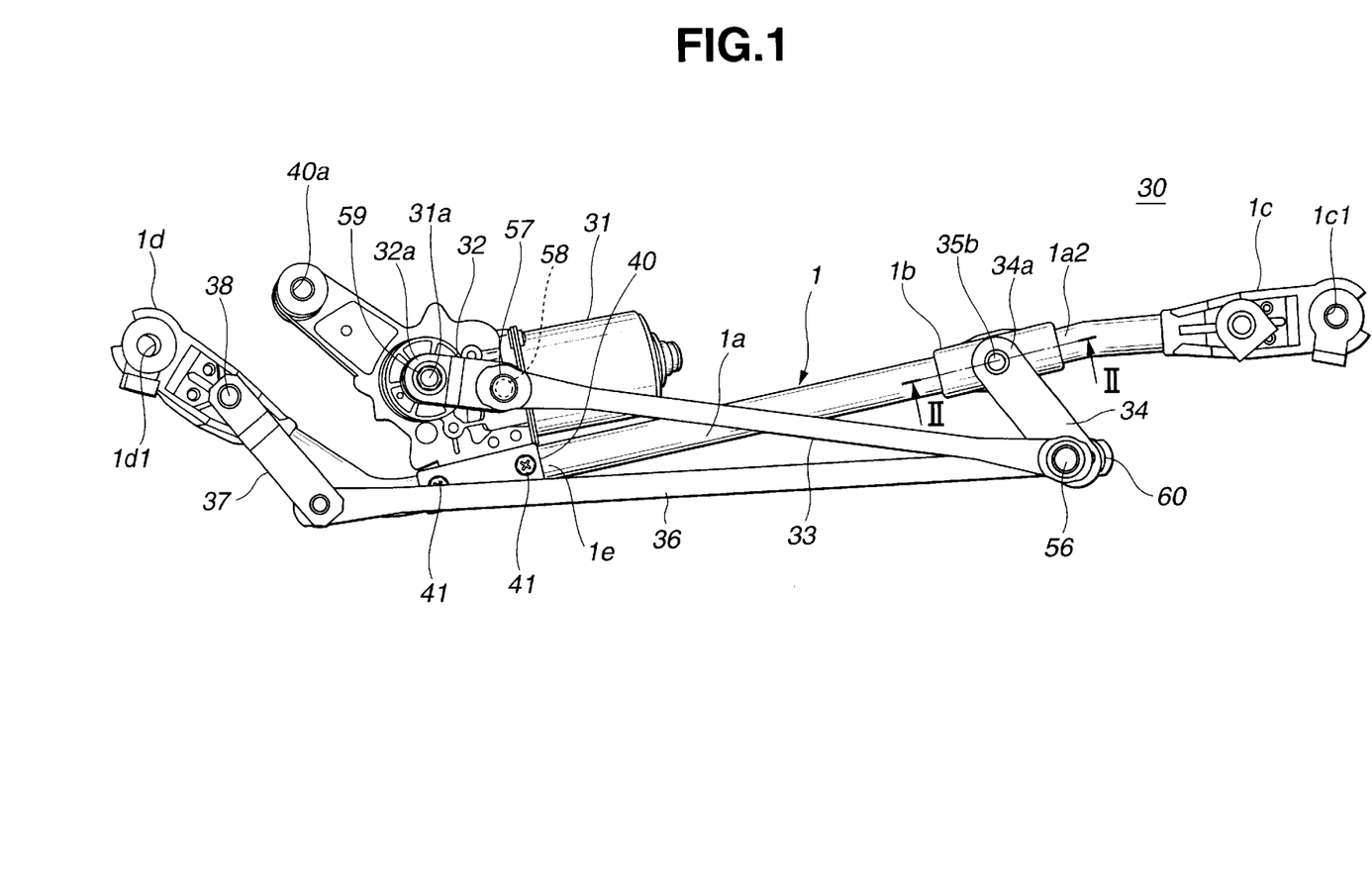
FIG. 1 is a top plan view illustrating an embodiment of the wiper unit provided with the pipe frame according to this invention.

The pipe frame 1 is provided in a wiper unit 30 as shown in FIG. 1, and the wiper unit 30 is provided with a wiper motor 31, a motor arm 32, a first link connecting rod 33, a first pivot arm 34, a first pivot shaft 35, a second link connecting rod 36, a second pivot arm 37 and a second pivot shaft 38.

The pipe frame 1 is provided with a pivot holder 1b, a first bracket 1c, a second bracket 1d and a motor-fixing part 1e on a pipe body 1a.

Figure 7:
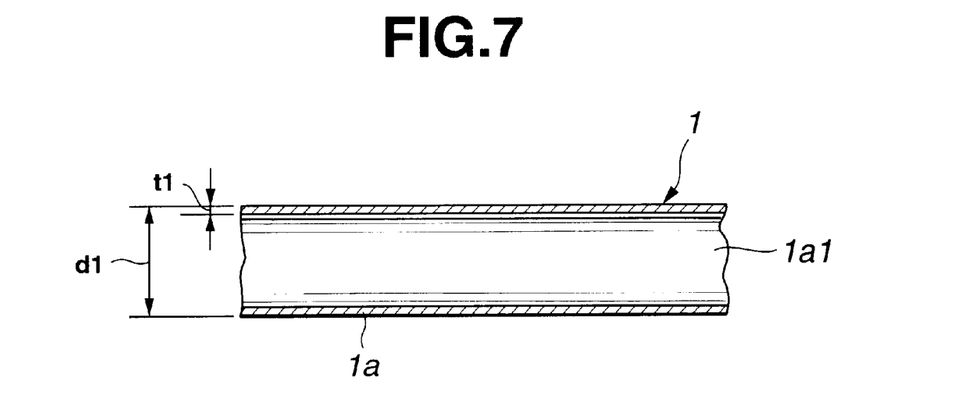
FIG. 7 is a cross-sectional view of the pipe body illustrating the first stage in the forming process of the pipe frame according to this invention.

The pipe body 1a is formed into a tubular shape having a hollow 1a1 with an outer diameter of d1 and a wall thickness of t1 as shown in FIG. 7.

The pipe body 1a is provided with a pivot holder-moulding part 1a2 at a position near to the right side end thereof as shown in FIG. 1, and the pivot holder-moulding part 1a2 is formed with a plate portion 1a3, a hollow cylindrical protrusion 1a4, and crush-projections 1a11 and 1a12.

Figure 4:
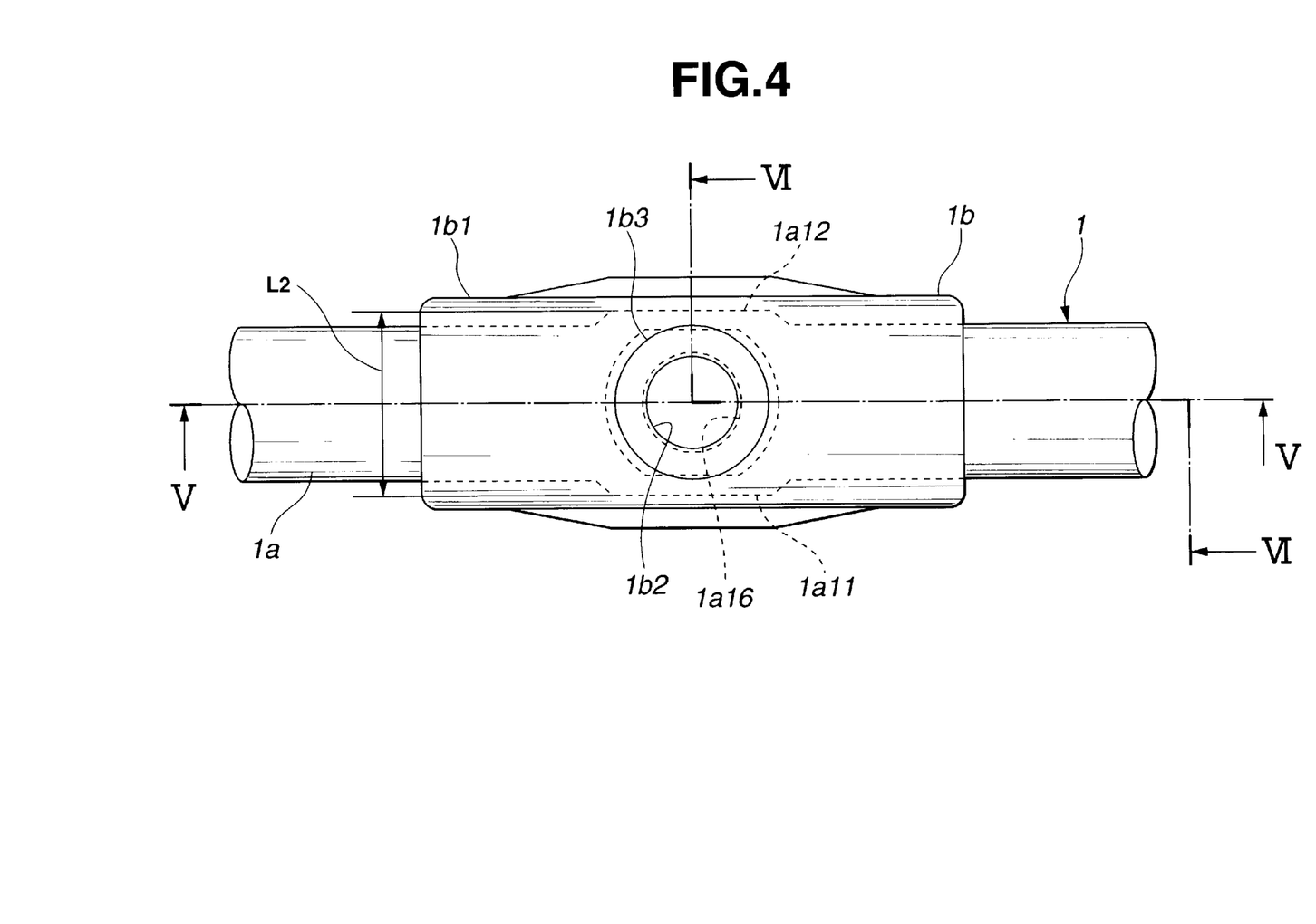
FIG. 4 is plan view of the pivot holder shown in FIG. 3.
Figure 6:
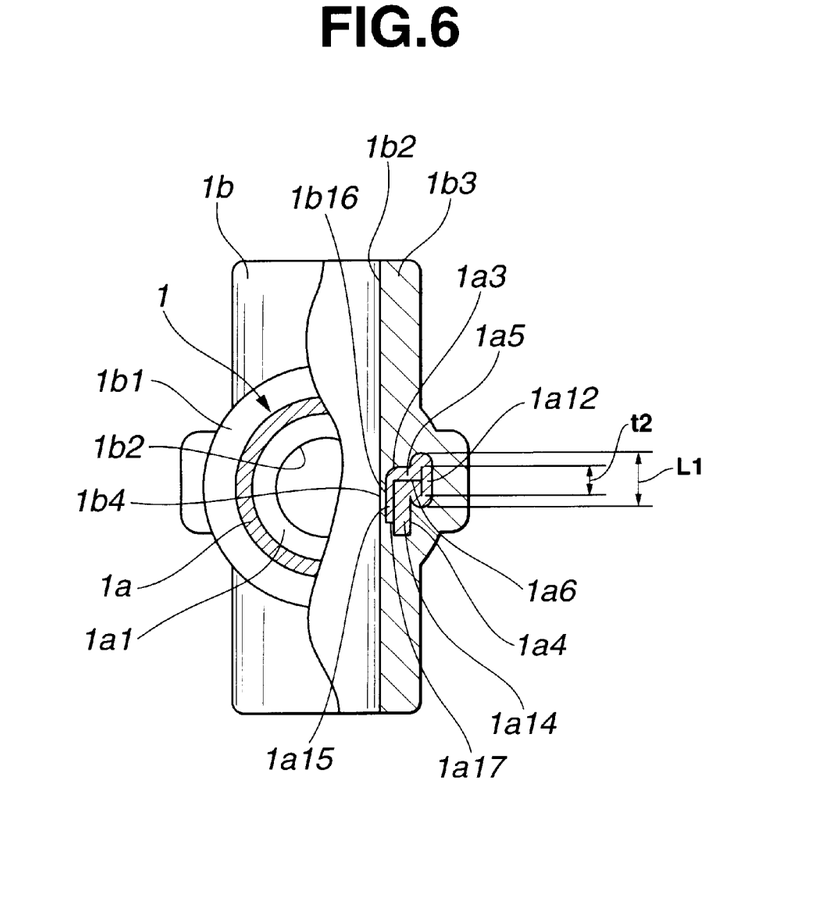
FIG. 6 is a cross-sectional view along section lines VI—VI of FIG. 4.
Figure 8:
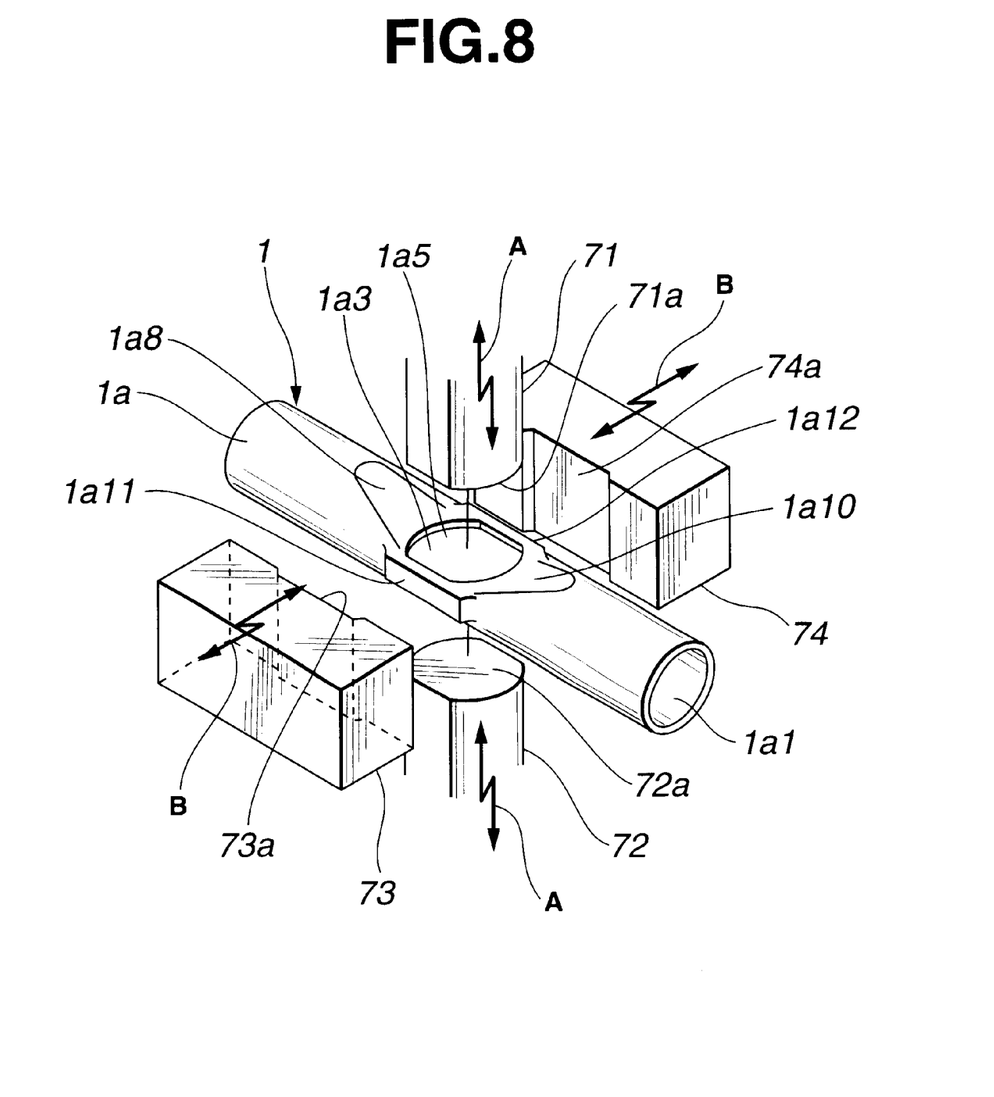
FIG. 8 is a perspective view of the plate portion illustrating the first stage in the forming process of the pipe frame according to this invention.
Figure 9:
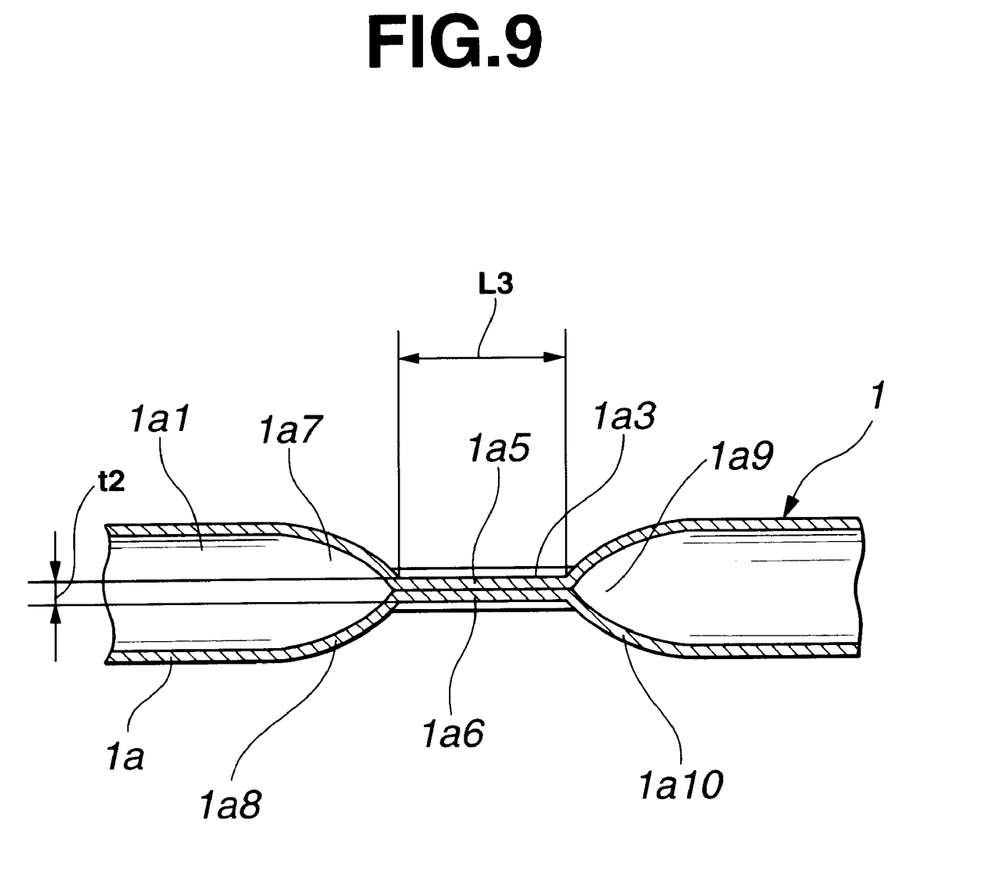
FIG. 9 is a cross-sectional view of the plate portion illustrating the first stage in the forming process of the pipe frame according to this invention.

The plate portion 1a3 is formed so as to bring an upper and a lower wall 1a5, 1a6 of the pipe body 1a in full contact without clearance by compressing the pipe body 1a in a direction-A perpendicular to the axial direction of the pipe body 1a with a first and a second press die 71 and 72 and a direction B perpendicular to the direction A with a third and a fourth press die 73 and 74 as shown in FIG. 8. Whereby the plate portion 1a3 is formed in a thickness of t2 as shown in FIG. 9. In this time, the plate portion 1a3 is formed with the rectangular crush-projections 1a11 and 1a12 compressed in a height of L1 larger than the thickness t2 of the plate portion 1a3 on the respective sides thereof as shown in FIG. 6. The projections 1a11 and 1a12 have outside dimension L2 as shown in FIG. 4.

The plate portion 1a3 is formed in a length L3 larger than an inner diameter d2 of a pivot shaft-hole 1b2 of the pivot holder 1b to be moulded around the plate portion 1a3 in the axial direction of the pipe body 1a as shown in FIG. 9. The pipe body 1a is divided into a first portion 1a8 and a second portion 1a10 according to the formation of the plate portion 1a3, and the hollow 1a1 is also divided into a first hollow 1a7 and a second hollow 1a9 isolated from each other by the plate portion 1a3 as shown in FIG. 9.

The plate portion 1a3 is formed in the thickness t2 by making the upper and lower walls 1a5 and 1a6 of the pipe body 1a come closely into contact and the crush-projections 1a11 and 1a12 with heights of L1 larger than the thickness t2 of the plate portion 1a3 are formed in rib-like shapes on the respective sides thereof as mentioned above, therefore the mechanical strength of the plate portion 1a3 becomes higher as compared with a case where the pipe body is merely compressed in a plate-like shape.

Figure 10:
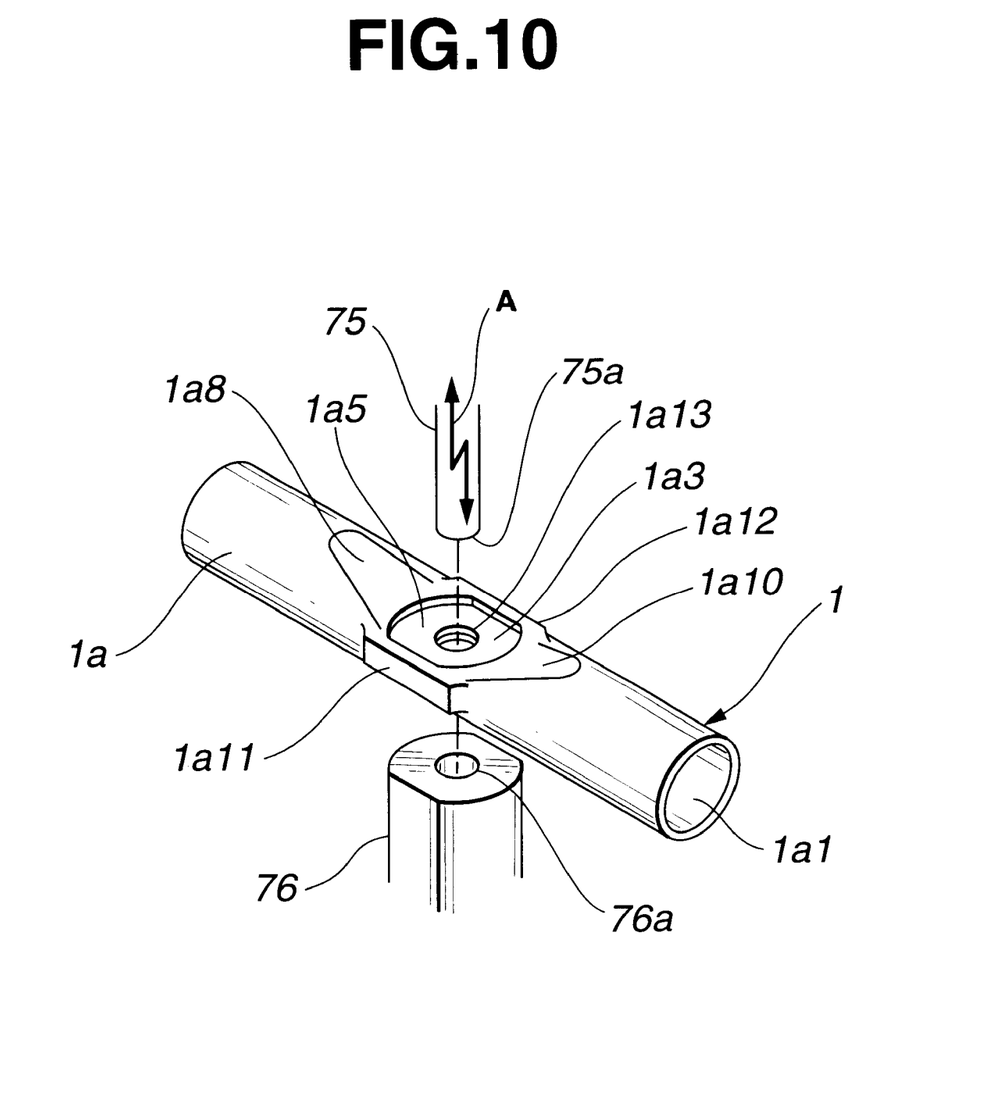
FIG. 10 is a perspective view of the plate portion illustrating the second stage in the forming process of the pipe fame according to this invention.
Figure 11:
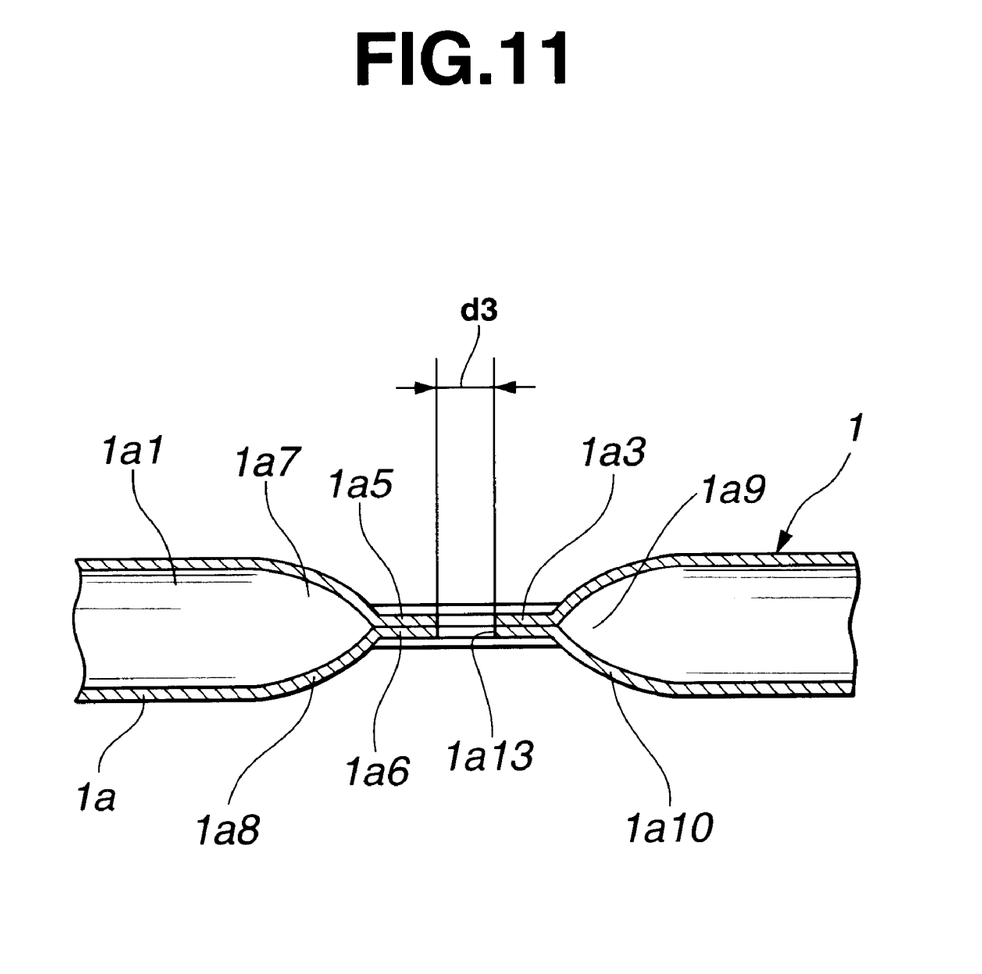
FIG. 11 is a cross-sectional view of the plate portion illustrating the second stage in the forming process of the pipe frame according to this invention.

In the plate portion 1a3, a through prepared hole 1a13 is made according to punching work in the direction A with a fifth and a sixth press die 75 and 76 in the center of the plate portion 1a3 as shown in FIG. 10. The prepared hole (base hole) 1a13 has an inside diameter of d3 as shown in FIG. 11.

Figure 12:
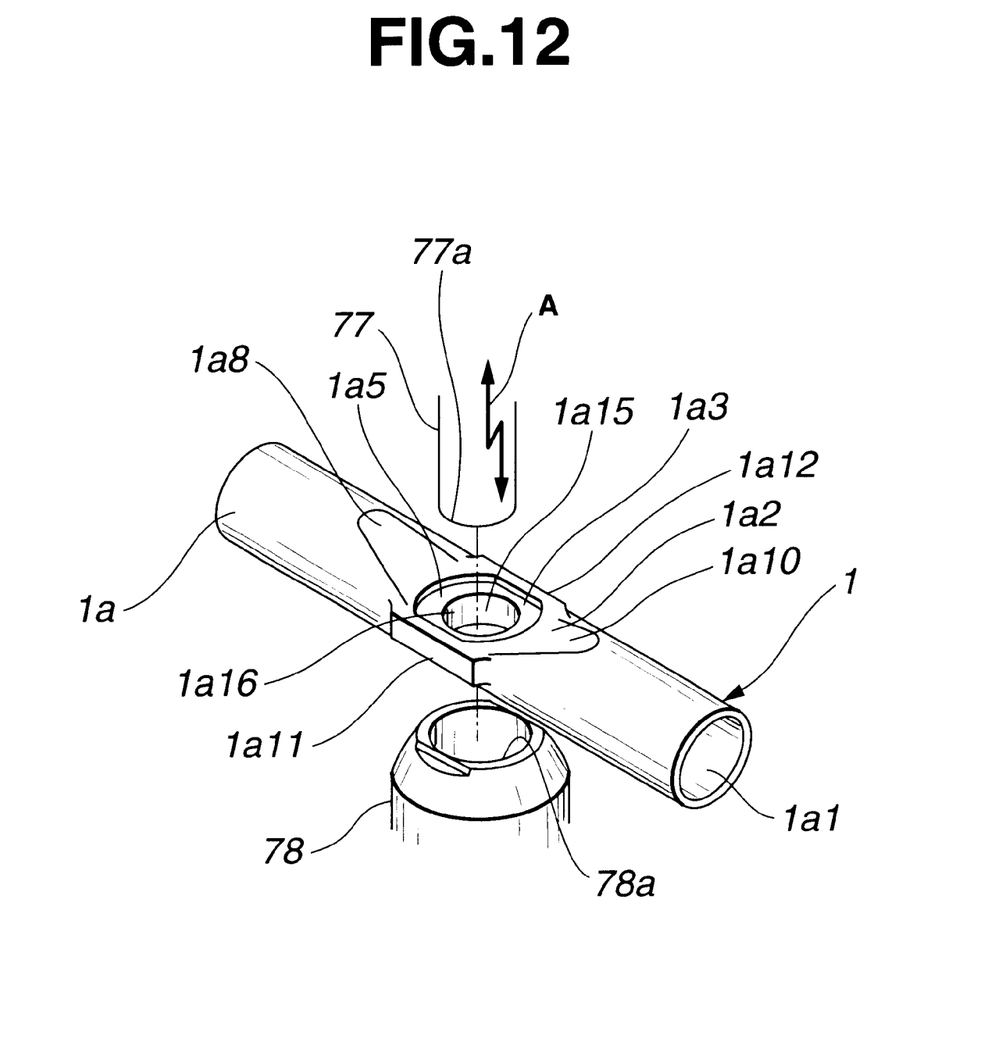
FIG. 12 is a perspective view of the plate portion illustrating the third stage in the forming process of the pipe frame according to this invention.

The hollow cylindrical protrusion 1a4 is formed in a hollow cylindrical shape protruding from the plate portion 1a3 in the lower direction perpendicular to the face of the plate portion 1a3 through the press working in the direction A with a seventh and a eighth press die 77 and 78 on basis of the prepared hole 1a13 as shown in FIG. 12.

Figure 5:
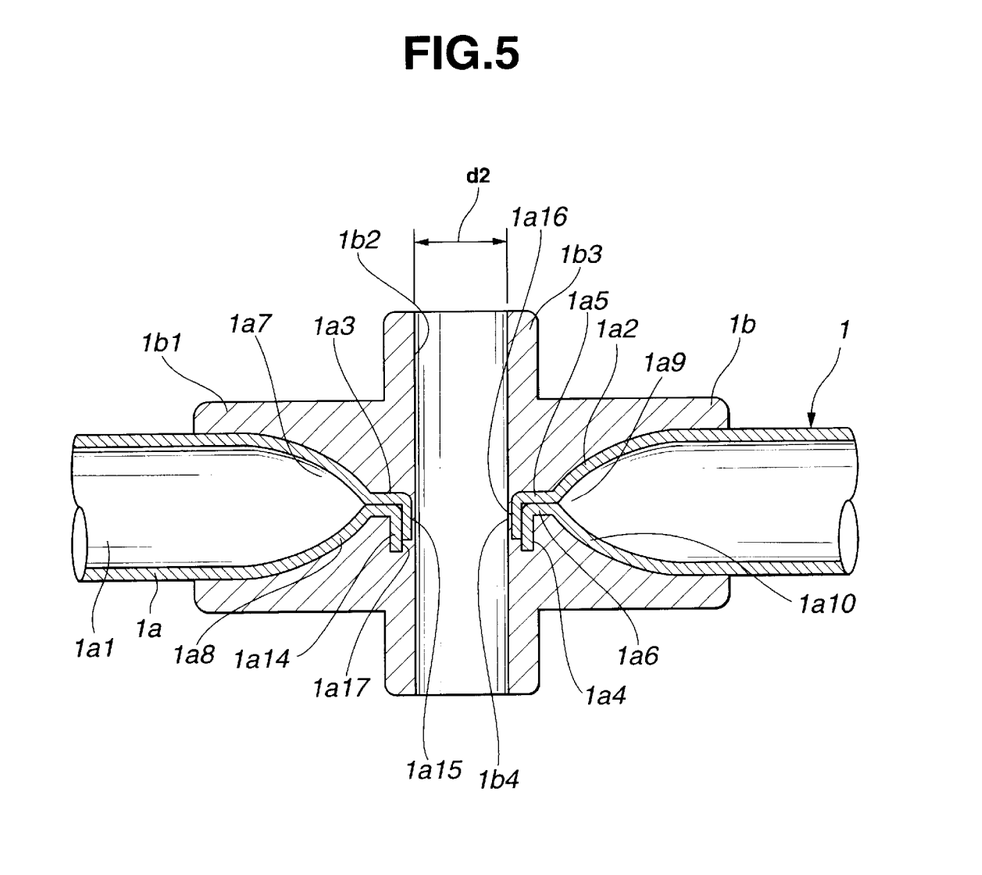
FIG. 5 is a cross-sectional view along section lines V—V of FIG. 4.
Figure 13:
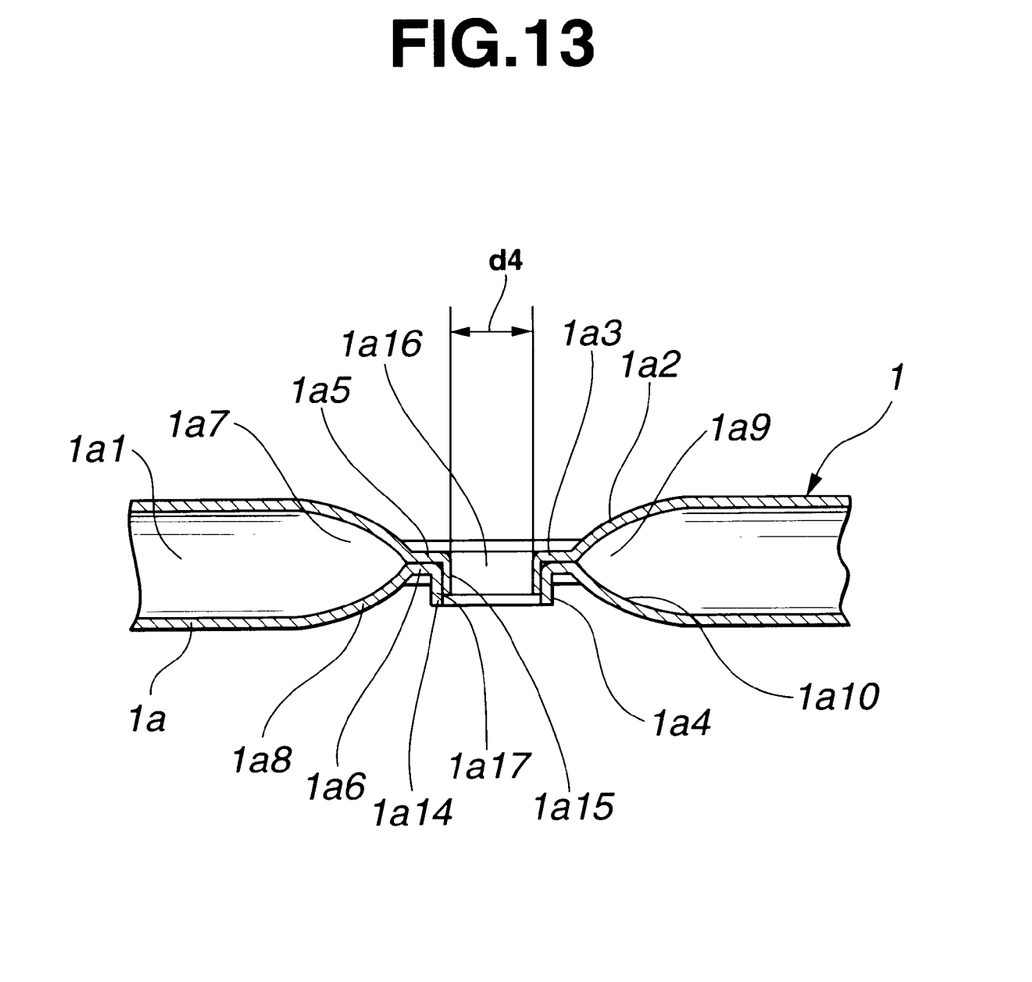
FIG. 13 is a cross-sectional view of the plate portion illustrating the third stage in the forming process of the pipe frame according to this invention.

The hollow cylindrical protrusion 1a4 is composed of an outside wall 1a14 stretched from the lower wall 1a6 of the plate portion 1a3 and an inside wall 1a15 stretched from the upper wall 1a5 of the plate portion 1a3 as shown in FIG. 13, and has an inside diameter d4 slightly larger than the inner diameter d2 of the pivot shaft-hole 1b2 of the pivot holder 1b shown in FIG. 5.

Figure 14:
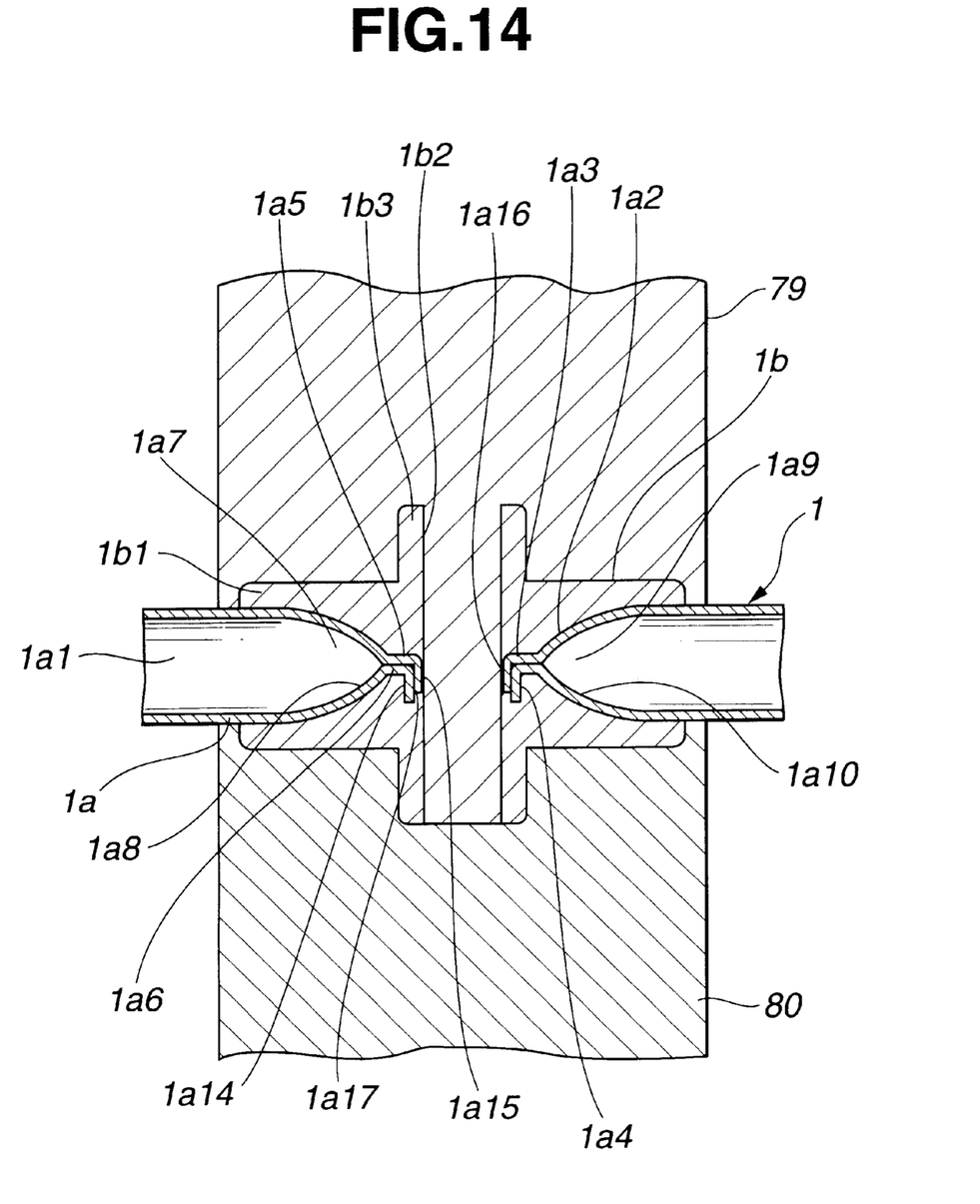
FIG. 14 is a cross-sectional view illustrating the outsert moulding of the pivot holder at the fourth stage in the forming process of the pipe frame according to this invention.

The pivot holder 1b is moulded integrately on the pipe body 1a through outsert moulding of resin around about the plate portion 1a3 provided with the crush-projections 1a11, 1a12 and the cylindrical protrusion 1a4, and the first and second portion 1a8, 1a10 of the pipe body 1a as shown in FIG. 14.

Figure 3:
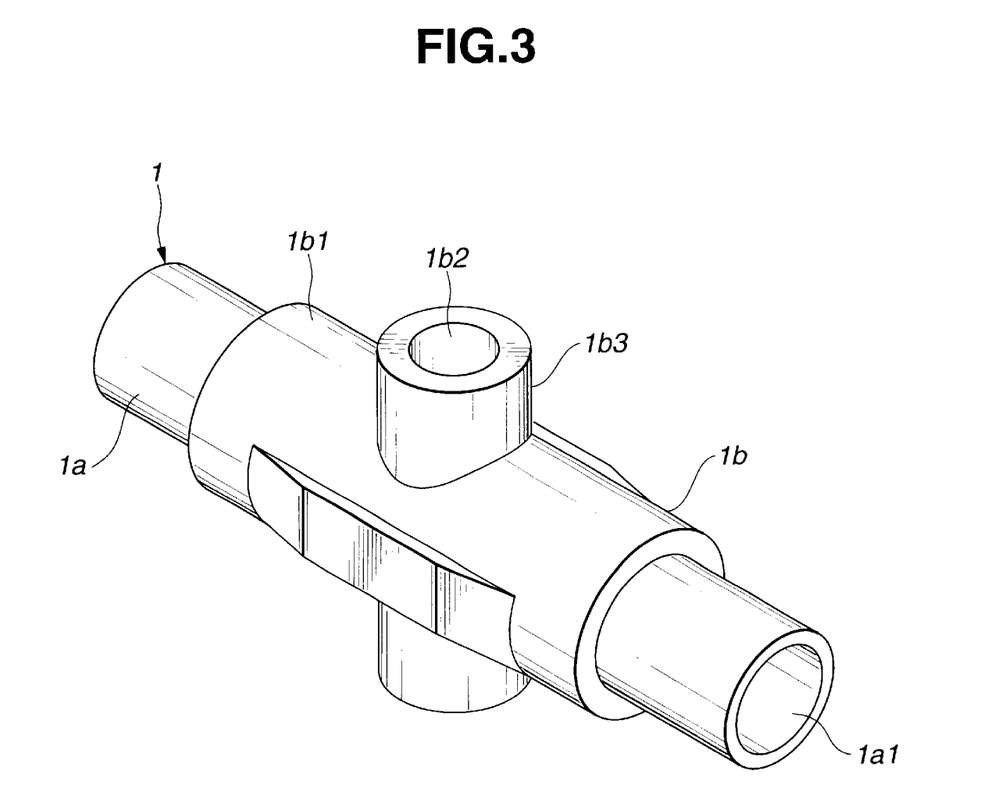
FIG. 3 is a perspective view illustrating the pivot holder in the pipe frame shown in FIG. 1.

The pivot holder 1b is composed of a holder body 1b1 moulded in a cylindrical shape on the outside of the pipe body 1a and a pivot shaft-support 1b3 moulded in a cylindrical shape in a direction perpendicular to the holder body 1b1 as shown in also in FIG. 3, and the pivot shaft-support 1b3 is formed with the pivot shaft-holder 1b2 having the inner diameter d2 slightly smaller than the inside diameter d4 of the hollow cylindrical protrusion 1a4 in a position corresponding to the hollow cylindrical protrusion 1a4 of the plate portion 1a3.

Namely, the pivot holder 1b is formed on the pipe body 1a in one body through the outsert moulding of resin against the pivot holder-moulding part 1a2 which is improved in the mechanical strength by the plate portion 1a3 composed of the upper and lower walls 1a5 and 1a6 being in full contact with each other, the projections 1a11 and 1a12 formed in rib-like shapes on the both sides of the plate portion 1a3, and the hollow cylindrical protrusion 1a4 disposed perpendicularly on the plate portion 1a3.

Furthermore, the outer and inner walls 1a14 and 1a15 of the hollow cylindrical protrusion 1a4 are formed by bending the lower and upper walls 1a6 and 1a5 composing the plate portion 1a3 at right angles, whereby the clearance between the upper and lower wall 1a5 and 1a6 of the plate portion 1a3 is blocked up by the walls 1a14 and 1a15 at a closing portion 1a17. Accordingly, the resin material does not flow into the hollows 1a7 and 1a9 of the pipe body 1a1 through the clearance (even if existent) between the upper and lower walls 1a5 and 1a6 at the time of outsert moulding of the pivot holder 1b.

Figure 2:
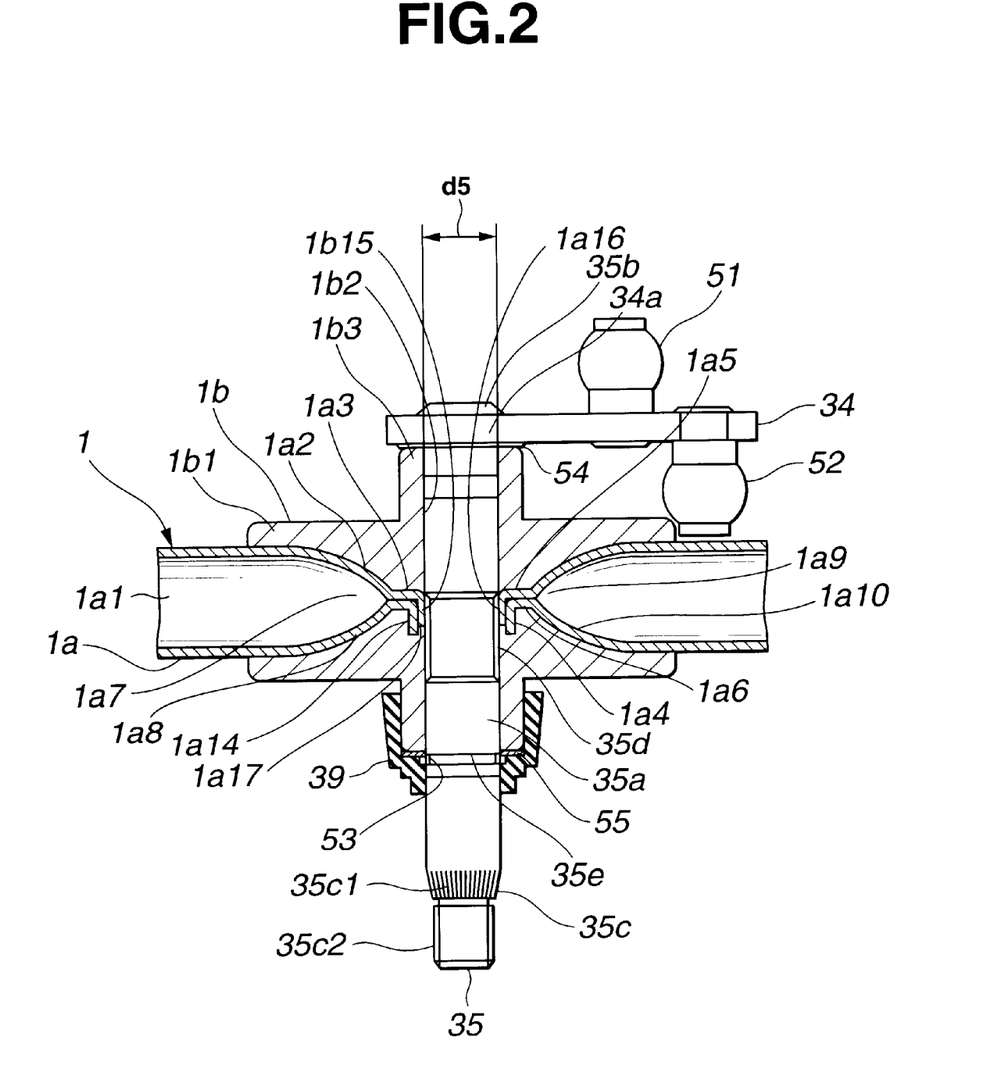
FIG. 2 is a cross-sectional view along section lines II—II of FIG. 1.

A first pivot shaft 35 is rotatably inserted into the pivot shaft-hole 1b2 of the pivot holder 1b. The first pivot shaft 35 is provided with an pivot arm-connecting part 35b at a base end (upper end in FIG. 2) of a shaft body 35a having a round rod-like shape with a outer diameter d5 slightly smaller than the inner diameter d2 of the pivot shaft-hole 1b2 and a wiper arm-fitting part 35c at a lower end of the shaft body 35a as shown in FIG. 2.

A first pivot arm 34 is secured by caulking to the pivot arm-connecting part 35b of the pivot shaft 35 at a shaft-securing part 34a formed at a base end thereof. The first pivot arm 34 is provided with a first ball pin 51 and a second bell pin 52 on the respective upper and the lower face thereof.

The pivot shaft 35 is formed with a serration 35c1 and a screw thread 35c2 at the wiper arm-fitting part 35c. The wiper arm-fitting part 35c is inserted into a fitting hole made in the base end of a first wiper arm (not shown), and the first wiper arm is secured to the wiper arm-fitting part 35c of the, pivot shaft 35 by screwing a nut (not shown) into the screw thread 35c2 after fitting the serration 35c with a serration receiver of the wiper arm. A first wiper blade (not shown) is fitted to a free end of the wiper arm.

The shaft body 35 is formed with an oil sump 35d with an outside diameter d6 slightly smaller than the outer diameter d5 at the middle thereof, and lubricant is enclosed between the pivot shaft-hole 1b2 and the oil sump 35d.

The shaft body 35 is formed with a groove 35e in a position between the wiper arm-fitting part 35c and the oil sump 35d, and the groove 35e is fitted with a C-shaped pin 53. Namely, the first pivot shaft 35 is inserted into the pivot shaft-hole 1b2 after fitting a wave washer 54 on the base end side thereof, and a flat washer 55 is fitted onto the pivot shaft 35 protruding out from the pivot shaft-hole 1b2 of the pivot holder 1b. Then the pivot shaft 35 is held rotatably in the pivot 1b so as not to come out from the shaft-hole 1b2 by fitting the C-shaped pin 53 into the groove 35e of the shaft body 35a. Furthermore, the C-shaped pin 53, the flat washer 55, the groove 35e and the lower end of the pivot shaft support 1b3 are covered with a pivot cover 39.

The first bracket 1c is provided to one end of the pipe body 1a on the right side in FIG. 1, and the first bracket 1c is formed with a body panel-securing part 1c1. The body panel-securing part 1c1 is so designed as to be passed through with a bolt (not shown) to be screwed into a panel of the vehicle body.

The second bracket 1d is provided to the other end of the pipe body 1a on the left side in FIG. 1, and the second bracket 1*d* is further provided with a second pivot shaft-hole (not shown) and a body panel-securing part 1*d*1. In the second pivot shaft-hole, a second pivot shaft 38 is supported rotatably similarly to the first pivot shaft 35. The body panel-securing part 1*d*1 is designed so as to be passed through with a bolt (not shown) similarly to the first bracket 1*c*, and the bolt is screwed into the panel of the vehicle body.

The motor-fixing part 1*e* is disposed on the pipe body 1a at a position between the pivot holder-moulding part 1*a*2 and the second bracket 1*d*, and the motor-fixing part 1*e* is secured with a motor bracket 40 fixed to the wiper motor 31 by screws 41 and 41.

The first ball pin 51 of the first pivot arm 34 is connected to a first ball retainer 56 attached to one end of the first link connecting rod 33 through a spherical pair. The first link connecting rod 33 is disposed with the first ball retainer 56 at the one end and a second ball retainer 57 at the other end thereof, and the second ball retainer 57 is connected with a third ball pin 58 attached to the free end of the motor arm 32 through a spherical pair.

The motor arm 32 is secured to an output shaft 31*a* of the wiper motor 31 at an output shaft-fixing part 32*a* formed on the base end thereof by tightening a nut 59, and disposed with the third ball pin 58 at the free end thereof.

The wiper motor 31 is provided with the output shaft 31*a* rotatable according to the power supply and fixed with the motor bracket 40. The motor bracket 40 is provided with a body panel-securing part 40*a* having a function similar to the first and second brackets 1*c* and 1*d*.

The second ball pin 52 of the first pivot arm 34 is connected to a third ball retainer 60 attached to one end of the second link connecting rod 36 through a spherical pair. The second link connecting rod 36 is disposed with the third ball retainer 60 at the one end and a fourth ball retainer (invisible in FIG. 1) at the other end thereof, and the fourth ball retainer is connected to a ball pin (invisible in FIG. 1) attached to the free end of the second pivot arm 37 through a spherical pair.

The second pivot arm 37 is fixed to the base end of the second pivot shaft 38 by caulking at the base end thereof, and disposed with the fourth ball pin at the free end thereof. The second pivot shaft 38 is fixed with the base end of a second wiper arm by screwing at the top end thereof and a second wiper blade is fitted to the top end of the second wiper arm.

In the wiper unit 30, the output shaft 31*a* is rotated by supplying an electric current to the wiper motor 31, thereby rotating the motor arm 32 and the rotation of the motor arm 32 is converted into the reciprocating turn of the first pivot arm 34 through the link connecting rod 33. The first pivot shaft 35 is turned reciprocatingly by the reciprocating turn of the first pivot shaft 35, whereby the first wiper arm swings reciprocatingly above the windshield and the windshield of the vehicle is wiped by the wiper blade. Furthermore, the second pivot arm 37 is turned reciprocatingly by the reciprocating turn of the first pivot arm 34 through the second link connecting rod 36, and the second pivot shaft 38 is turned reciprocatingly whereby the second wiper arm swings reciprocatingly above the windshield and the windshield is wiped with the wiper blade.

The pipe frame 1 used for such the wiper unit 30 is formed through the following process.

The first stage in the forming process is shown in FIGS. 7 to 9 for forming the plate portion 1*a*3 on the pipe body 1*a*.

In this first stage of the process, the first and second press dies 71 and 72, the third and fourth press dies 73 and 74 are used. The first and second press dies 71 and 72 are provided with die faces 71*a* and 72*a* corresponding to the size of the plate portion 1*a*3 formed with the upper and lower walls 1*a*5 and 1*a*6 of the pipe body 1a, respectively. The third and fourth press dies 73 and 74 are provided with die cavities 73*a* and 74*a* corresponding to the outside dimension L2 of the plate portion 1*a*3.

The plate portion 1*a*3 is formed by tightly contacting the upper and lower wall 1*a*5 and 1*a*6 of the pipe body 1*a* with each other through the press working in the first direction A perpendicular to the longitudinal direction of the pipe body 1a with the first and second press dies 71 and 72, and the rectangular crush-projections 1*a*11 and 1*a*12 are formed on the both sides of the plate portion 1*a*3 through the press working in the second direction B perpendicular to the first direction A with the third and fourth press dies 73 and 74.

The second stage in the forming process of the pipe frame 1 is shown in FIGS. 10 and 11 for making the prepared hole 1*a*13 in the plate portion 1*a*3.

The fifth and sixth press dies 75 and 76 are used in this second stage. The fifth press die 75 is a punch and provided with an edge 75*a* with dimensions corresponding to the inner diameter d3 of the prepared hole 1*a*13. The sixth press die 76 is also provided with an edge 76a corresponding to the edge 75*a* of the fifth press die 75.

The through prepared hole 1*a*13 with the inner diameter of d3 is made in the center of the plate portion 1*a*3 by the punching work in the first direction A perpendicular to the axial direction of the pipe body 1*a* with the fifth and sixth press dies 75 and 76. The prepared hole 1*a*13 works as a base hole at a time of forming the hollow cylindrical protrusion 1*a*4 in the third stage of the forming process.

The third stage in the forming process of the pipe frame 1 is shown in FIGS. 12 and 13 for forming the hollow cylindrical protrusion 1*a*4 on the plate portion 1*a*3.

In this third stage, burring is carried out using the seventh and eighth press dies 77 and 78. The seventh press die 77 is a punch and provided with an edge 77*a* with dimensions corresponding to the inner diameter d4 of the hollow cylindrical protrusion 1*a*4. The eighth press die 78 has an edge 78*a* with dimensions corresponding to the edge 77*a* of the seventh press die 77.

The hollow cylindrical protrusion 1*a*4 is formed projectingly in the direction perpendicular to the face of the plate portion 1*a*3 through the burring in the first direction A perpendicular to the axial direction of the pipe body 1*a* with the seventh and eighth press dies 77 and 78, consequently the pivot holder-moulding part 1*a*2 is formed completely on the pipe body 1*a*.

The fourth stage in the forming process is shown in FIG. 14 for moulding the pivot holder 1*b* at the pivot holder-moulding part 1*a*2 of the pipe body 1*a*.

In this fourth stage, a first and a second moulding die 79 and 80 are used. The first moulding die 79 is used for moulding the upper half body of the pivot holder 1*b* and the pivot shaft-hole 1*a*2 of the pivot holder 1*b*, and the second moulding die 80 is used for moulding the lower half body of the pivot holder 1*b*.

The pivot holder 1*b* is formed at the pivot holder-moulding part 1*a*2 of the pipe body 1*a* through the outsert moulding of resin using the first and second moulding dies 79 and 80. In this time, the closing portion 1*a*17 is formed between edges of the outer and inner wall 1*a*14 and 1*a*15 composing the hollow cylindrical protrusion 1*a*4, therefore the resin material is moulded into the pivot holder 1*b* by the outsert moulding without flowing into the hollows 1a7 and 1a9 of the pipe body 1a through the clearance (even if existent) between the upper and lower walls 1a5 and 1a6 of the plate portion 1a3.

As mentioned above, the pivot holder 1b is unified to the pipe body 1a through the outsert moulding against the pivot holder-moulding part 1a2 reinforced by the plate portion 1a3 formed by the upper and lower walls 1a5 and 1a6 in full contact with each other, the crush-projections 1a11 and 1a12 formed in the rib-like shapes on the both sides of the plate portion 1a3, and the hollow cylindrical protrusion 1a4 disposed perpendicularly on the plate portion 1a3.

Furthermore, the outer and inner walls 1a14 and 1a15 of the hollow cylindrical protrusion 1a4 are formed by pressing the lower and upper walls 1a6 and 1a5 of the plate portion 1a3 and stretched from the surface of the plate portion 1a3, and the closing portion 1a17 is formed between edges of the outer and inner walls 1a14 and 1a15, accordingly the resin material is blocked out by the closing portion 1a17 of the cylindrical protrusion 1a4 and never flows into the hollows 1a7 and 1a9 of the pipe body 1a at the time of outsert moulding of the pivot holder 1b.

Additionally, the inside diameter d2 of the pivot shaft-hole 1b2 of the outsert-moulded pivot holder 1b is formed so as to be slightly larger than outer diameter d5 of the first pivot shaft 35, and formed into size smaller than inner diameter d4 of the hollow cylindrical protrusion 1a4. Further, there is a thin-walled resin layer 1b4 between the outer peripheral part of the pivot shaft 35 and the inner wall 1a16 of the hollow cylindrical protrusion 1a4, therefore the first pivot shaft 35 does not come contact directly with the inner wall 1a16 of the cylindrical protrusion 1a4.

As explained above, according to this invention, the pivot holder is moulded integrately on the plate portion formed by compressing the pipe body and provided with the crush-projections formed on the both sides of the plate portion and the hollow cylindrical protrusion formed on the plate portion. Accordingly, it is possible to improve the mechanical strength of the plate portion as compared with the conventional pipe frame merely manufactured by press working, and an excellent effect can be obtained in that it is possible to provide the pipe frame having the improved mechanical strength. Furthermore, the plate portion is provided with the hollow cylindrical protrusion in stead of the simple hole in order to receive the pivot shaft, therefore it is prevented to form a path to introduce the resin material into the hollow of the pipe body. Consequently, an excellent effect can be also obtained in that it is possible to reduce the loss of the material resin.

What is claimed is:

1. A pipe frame for a wiper apparatus of a vehicle comprising:

a pipe body with a hollow;

a plate portion formed by compressing said pipe body;

crush-projections formed on both sides of said plate portion;

a hollow cylindrical protrusion formed on said plate portion; and a pivot holder formed through outsert moulding of resin around about said plate portion of the pipe body and provided with a pivot shaft-hole communicated with the hollow cylindrical protrusion of the plate portion.

2. A pipe frame as set forth in claim 1, wherein said plate portion is formed by compressing the pipe body in full contact so as not to leave a hollow therein;

said crush-projections are formed by compressing the plate portion in a direction perpendicular to a compressing direction of said plate portion;

said hollow cylindrical protrusion is formed so as to protrude in a direction perpendicular to a surface of said plate portion; and said pivot shaft-hole of the pivot holder is provided with an inner wall substantially flush with an inner wall of said cylindrical protrusion.

3. A pipe frame as set forth in claim 2, wherein said inner wall of the hollow cylindrical protrusion is continued from a surface of said plate portion and blocks the hollow of the pipe body from the hollow cylindrical protrusion of the plate portion.

4. A wiper unit for a vehicle comprising:

a pipe frame according to claim 3;

a pivot shaft rotatably supported in said pivot shaft-hole of the pivot holder of said pipe frame;

a pivot arm connected to said pivot shaft at a base end thereof;

a wiper motor provided with an output shaft to be rotated according to power supply;

a motor arm connected to the output shaft of said wiper motor at a base end thereof; and a link connecting rod connected between free ends of said pivot arm and said motor arm.

5. A wiper unit as set forth in claim 4, wherein said wiper motor is secured with a motor bracket; and said pipe body is provided with a motor-fixing portion to be secured with the motor bracket of said wiper motor and a fitting bracket to be secured with a vehicle body.

6. A wiper unit for a vehicle comprising:

a pipe frame according to claim 2;

a pivot shaft rotatably supported in said pivot shaft-hole of the pivot holder of said pipe frame;

a pivot arm connected to said pivot shaft at a base end thereof;

a wiper motor provided with an output shaft to be rotated according to power supply;

a motor arm connected to the output shaft of said wiper motor at a base end thereof; and a link connecting rod connected between free ends of said pivot arm and said motor arm.

7. A wiper unit as set forth in claim 6, wherein said wiper motor is secured with a motor bracket; and said pipe body is provided with a motor-fixing portion to be secured with the motor bracket of said wiper motor and a fitting bracket to be secured with a vehicle body.

8. A wiper unit for a vehicle comprising:

a pipe frame according to claim 1;

a pivot shaft rotatably supported in said pivot shaft-hole of the pivot holder of said pipe frame;

a pivot arm connected to said pivot shaft at a base end thereof;

a wiper motor provided with an output shaft to be rotated according to power supply;

a motor arm connected to the output shaft of said wiper motor at a base end thereof; and a link connecting rod connected between free ends of said pivot arm and said motor arm.

9. A wiper unit as set forth in claim 8, wherein said wiper motor is secured with a motor bracket; and said pipe body is provided with a motor-fixing portion to be secured with the motor bracket of said wiper motor and a fitting bracket to be secured with a vehicle body.

10. A method for producing a pipe frame according to claim 1, said method comprising steps of:

forming the plate portion by compressing the pipe body and forming the crush-projections on both sides of said plate portion;

forming a base hole passing through the plate portion;

forming the hollow cylindrical protrusion on said plate portion by pressing a periphery of said base hole in a direction perpendicular to a surface of the plate portion; and forming the pivot holder on said pipe body integrally through the outsert moulding of resin around about said plate portion of the pipe body.

* * * * *